(12) United States Patent
Ramidi

(10) Patent No.: US 9,542,463 B2
(45) Date of Patent: Jan. 10, 2017

(54) METHOD AND SYSTEM FOR OPTIMIZING XA OPEN AND XA CLOSE OPERATIONS IN A DISTRIBUTED DATABASE SYSTEM

(75) Inventor: Madhusudhan R. Ramidi, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1183 days.

(21) Appl. No.: 11/768,128

(22) Filed: Jun. 25, 2007

(65) Prior Publication Data

US 2008/0320020 A1    Dec. 25, 2008

(51) Int. Cl.
*G06F 7/00* (2006.01)
*G06F 17/00* (2006.01)
*G06F 17/30* (2006.01)

(52) U.S. Cl.
CPC .............. *G06F 17/30575* (2013.01)

(58) Field of Classification Search
CPC ............... G06F 17/30227; G06F 17/30377; G06F 17/30575
USPC  707/2, 9, 102, 200, 617, 726, 783; 709/225, 229, 203, 228
See application file for complete search history.

(56) References Cited

U.S. PATENT DOCUMENTS

| | | | |
|---|---|---|---|
| 6,463,456 B1 | 10/2002 | Kan et al. | |
| 7,206,805 B1* | 4/2007 | McLaughlin, Jr. | 709/203 |
| 2003/0023617 A1* | 1/2003 | Hunt et al. | 707/202 |
| 2003/0046298 A1* | 3/2003 | Weedon | 707/102 |
| 2004/0088413 A1* | 5/2004 | Bhogi et al. | 709/226 |
| 2004/0221031 A1* | 11/2004 | Desai | 709/224 |
| 2005/0144171 A1 | 6/2005 | Robinson | |
| 2005/0182795 A1 | 8/2005 | Murthy | |

OTHER PUBLICATIONS

Author: Erickson et al.; Title: WebSphere Connection Pooling; Date: © Copyright 2001; pates: 1, 9-12, 30-32, 46-47; Link: http://www.crionics.com/products/opensource/faq/docs/connection_pool.pdf.*
Title: Distributed Transaction Processing: The XA Specification; Date: © Copyright Dec. 1991; pp. 42-43; Link: http://www.opengroup.org/onlinepubs/009680699/.*
Author: David Ritter; Title: The Middleware Muddle; Date: publication 1998; p. 87; Link: http://delivery.acm.org/10.1145/310000/306141/P086.pdf?key1=306141&key2=1027491721&coll=GUIDE&dl=GUIDE&CFID=85477120&CFTOKEN=38571363.*
X/Open Company Ltd., "Distributed Transaction Processing: The XA Specification", X/Open CAE Specification, Dec. 1991, pp. 1-80.
Oracle, "Oracle9i Database Server Patch Set Notes, Release 2 Patch Set 4 Version 9.2.0.5.0 for Solaris Operating Environment (SPARC 64-bit)", [online], [Retrieved on Jun. 1, 2016]. Retrieved from the Internet at <URL: http://community.hpe.com/hpeb/attachments/hpeb/itrc-160/25144/1/17281>, © 2001, 2004 Oracle, Total 21 pp.

* cited by examiner

*Primary Examiner* — Md. I Uddin
(74) *Attorney, Agent, or Firm* — Janaki K. Davda; Konrad, Raynes, Davda & Davda LLP

(57) ABSTRACT

A system and method in accordance with the present invention provides for delaying an xa_close call on a connection and reducing the number of xa_open/xa_close calls. This process improves upon the original method of carrying out the xa_close call. The connection is always in an xa_open stage and will avoid a subsequent costly xa_open/xa_close. The only event which triggers the xa_close is the time out on the connection.

2 Claims, 3 Drawing Sheets

US 9,542,463 B2

METHOD AND SYSTEM FOR OPTIMIZING XA OPEN AND XA CLOSE OPERATIONS IN A DISTRIBUTED DATABASE SYSTEM

FIELD OF THE INVENTION

The present invention relates generally to databases and more specifically to improving the performance of a database by optimizing operations thereon.

BACKGROUND OF THE INVENTION

Distributed database systems are utilized extensively for many applications. If an application needs to access multiple resource managers (database servers) in a single transaction, then the XA protocol should be used to ensure that the state remains consistent between them. The XA protocol supports the use of two-phase commit, ensuring that modifications between the multiple resources either commit together or are rolled back together. It should be noted that for many resource managers, using XA adds substantial overhead to all operations, not just the commit. As a result, XA should be used only when necessary. Resource managers (database servers) that do not "know" about one another can not cooperate directly in distributed transactions. (Example: a transaction may span over an Informix, DB2 and Oracle database.) Instead, the transaction manager controls the transaction, indicating to each resource manager whether and when to commit or roll back, based on the global state of the transaction. A transaction manager coordinates transactions between resource managers using a two-phase commit protocol. The two-phase commit protocol provides the ACID (Atomicity, Consistency, Isolation, Durability) properties of transactions across multiple resources.

In the first phase of two-phase commit, the transaction manager tells each resource to "prepare" to commit; that is, to perform all operations for a commit and be ready either to make the changes permanent or to undo all changes. Each resource manager responds, indicating whether or not the prepare operation succeeded.

In the second phase, if all prepare operations succeed, the transaction manager tells all resource managers to commit their changes; otherwise, it tells them all to roll back and indicates transaction failure to the application.

A particular resource manager may participate in multiple simultaneous distributed transactions. The ACID properties apply for all resource managers involved in a particular distribute transaction, as well as for all pending transactions within a particular resource manager.

A distributed transaction protocol, such as XA includes, i.e., a 2 phase commit mechanism supported by major database vendors, transaction managers and client tool vendors. The protocol involves xa_open followed by xa_close which are used to enable/disable distributed transactions equivalent to a database open and database close statements in a normal connection/transaction scenario. The xa_open and xa_close calls both require a considerable amount of time because they require accessing resource managers on the network. Therefore, it is desirable to optimize the number of open and close calls to minimize the time required to execute transactions.

SUMMARY OF THE INVENTION

A method and system for optimizing the number of xa open and xa_close calls in a distributed database system is disclosed. The method and system comprise providing xa_criteria and xa_info in a connection and determining if there is a connection within a connection pool with a same criteria and xa_info. The method and system includes performing a two phase commit operation that ensures that the modifications between multiple resources commit together or rollback together without having to perform an xa_open call to a database server on a network if there is a connection with the same criteria and xa_info. The method and system includes storing the xa_info in the connection; performing the xa_close operation when the connection times out.

DETAILED DESCRIPTION

Definitions

Terminology of XA
 (a) Xid: Transaction ID+Branch Qualifier
 (b) RM—Resource Manager (database server)
 (c) TM—Transaction manager
 (d) Transaction branch—a branch that is part of the global transaction
 (e) 2 phase commit: consists of 2 phase commit, first phase is the prepare and the second phase is commit or rollback depending upon the response received from prepare.
 (f) xa_info: information pertaining to XA. xa_info has instance specific information like database server name, database name, and flags.
  xa_open: Open a resource manager and prepare it for use in a distributed transaction environment. Should be called before any other XA call.
  xa_close: Close a resource manager.
  xa_start: Start work on behalf of a transaction branch.
  xa_end: End work on behalf of a transaction branch.
  xa_prepare: Prepare message called by transaction manager, i.e., the first phase of the two phase commit mechanism.
  xa_commit: rollback work done on the transaction branch.
  xa_recover: Transaction manager calls this. Resource manager returns prepared xid's.

The present invention relates generally to databases and more specifically to improving the performance of a database by optimizing operations thereon. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
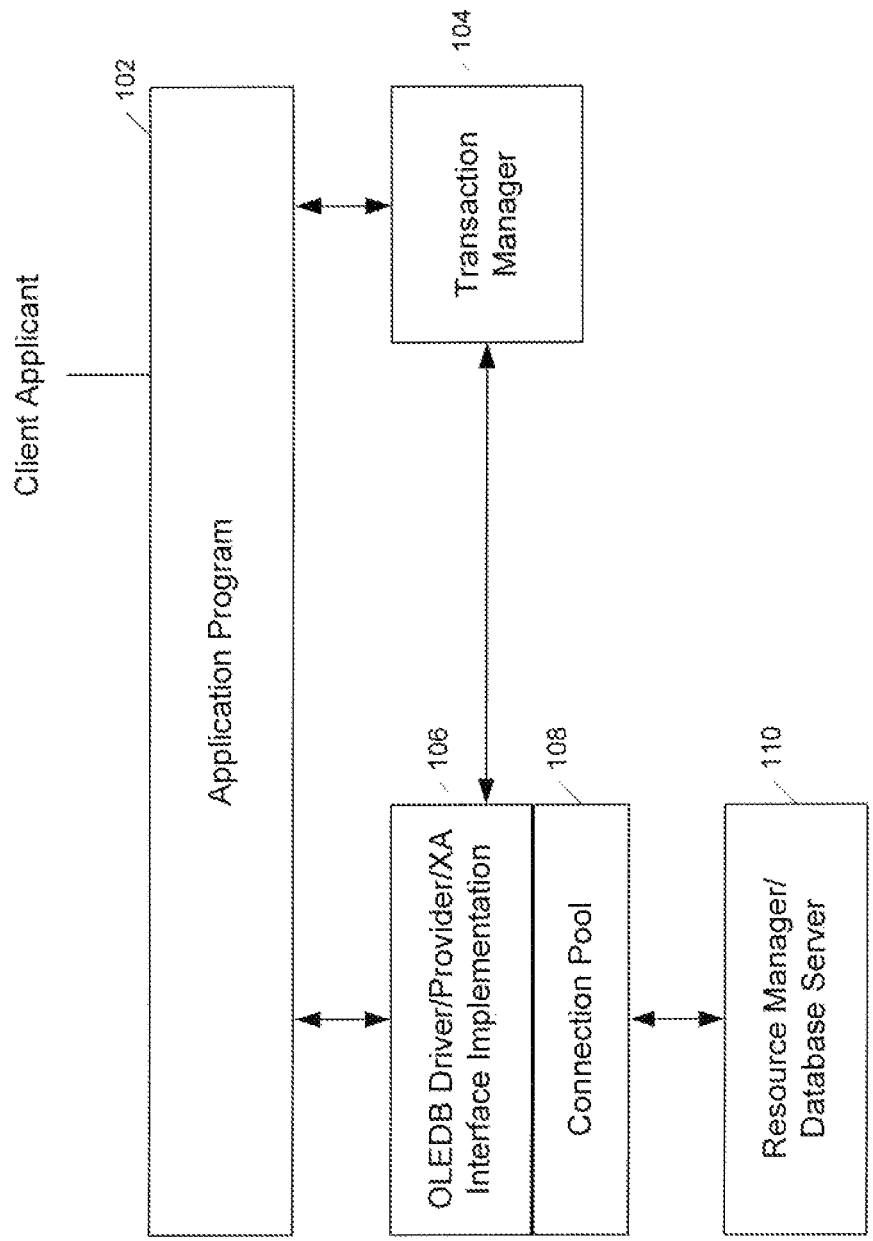
FIG. 1 is a block diagram of a distributed network in accordance with an embodiment.

FIG. 1 is a block diagram of a distributed network in accordance with the present invention. The distribution network comprises an application program 102, transaction manager 104, driver/provider interface implementation 106, connection pool 108, and one or more resource manager(s)/database server(s) 110.

Figure 2:
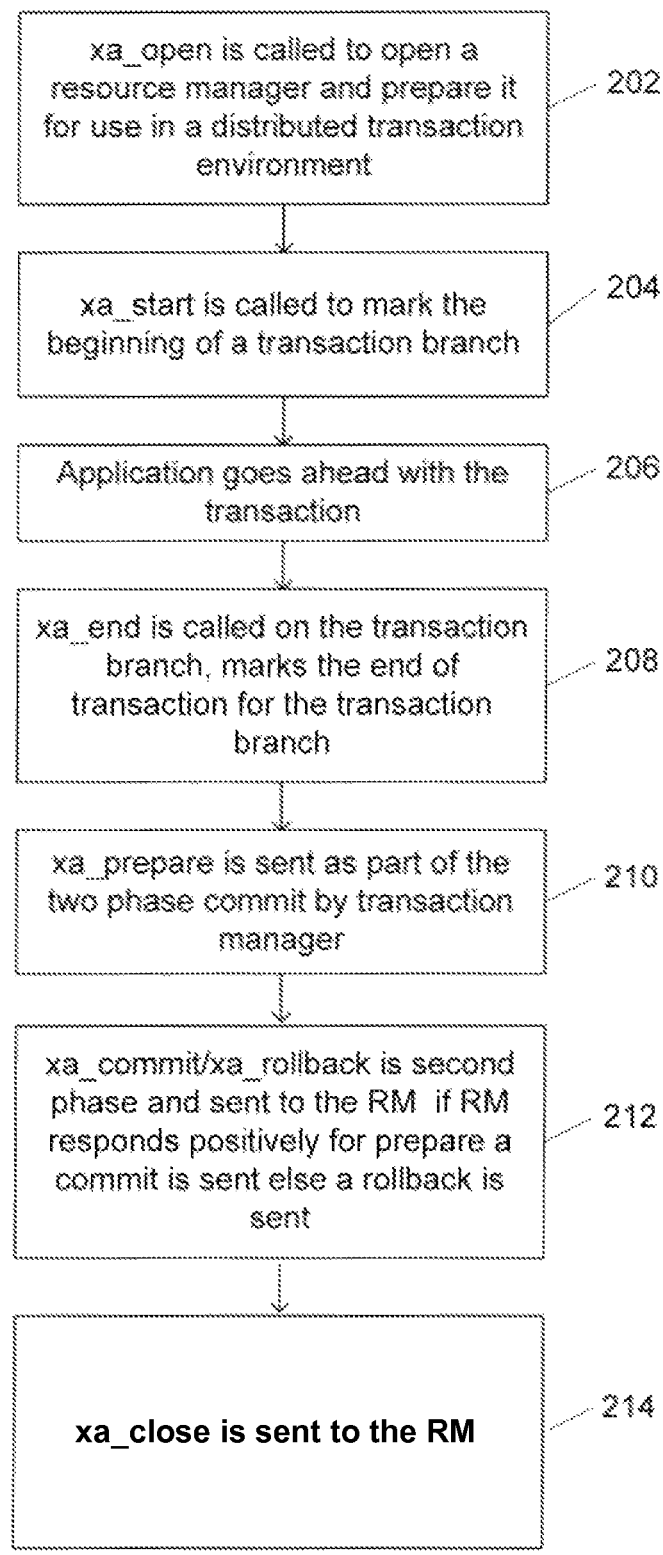
FIG. 2 is a flow chart of a conventional flow of calls when performing a transaction in a distributed database.

FIG. 2 is a flow chart of a conventional flow of calls when performing a transaction in a distributed database. Referring now to FIGS. 1 and 2 together, first, xa_open is called to open one or more resource managers 110 and prepare them for use in a distributed transaction environment, via step 202. Please note that the xa_open is not equivalent to the physical connection with database. A physical connection is opened for an xa_open that is called for each resource manager 110.

Next, xa_start is called to mark the beginning of a transaction branch, via step 204. Branch is basically the part of the transaction which is associated with the one or more particular resource managers 110.

Then, the application 102 goes ahead with the transaction, via step 206. In an embodiment it does everything that is needed: an example is to transfer money from one account to another account where each account resides in a different database server which could be heterogeneous (Oracle, Informix, DB2, et).

Thereafter, xa_end is called on the transaction branch, and marks the end of transaction for the transaction branch, via step 208.

Finally, $xa_{13}$ close is sent to all of the resource managers 110, via step 214.

Thereaftere, $xa_{13}$ end is called on the transaction branch, and marks the end of transaction for the transaction branch, via step 208'. Then, xa_prepare is sent as part of the two phase commit by transaction manager to the resource managers, via step 210'. Next, $xa_{13}$ commit or xa_rollback is sent to the resource managers. If all of the resource managers 110, respond positively, a commit is sent and if all resource managers do not respond positively, a rollback is sent, via step 212'.

Finally, xa_close is sent to all of the resource managers 110, via step 914. The connection moves into the connection pool 118. When another transaction comes in, the above sequence is repeated.

As before mentioned, the problem with this conventional flow is that the xa_open and xa_close calls are executed when they are not needed. That is, sometimes the appropriate connection is already in the connection pool and the xa_open does not need to be executed.

A system and method in accordance with the present invention provides for delaying xa_close on a connection and reducing the number of xa_open/xa_close calls. This process improves upon the conventional method of carrying out the xa_close. The connection is always in an xa_open stage and will avoid a subsequent costly xa_open/xa_close. The only event which triggers the xa_close is the time out on the connection. To illustrate the features of the present invention in more detail, refer now to the following description in conjunction with the accompanying figures.

Figure 3:
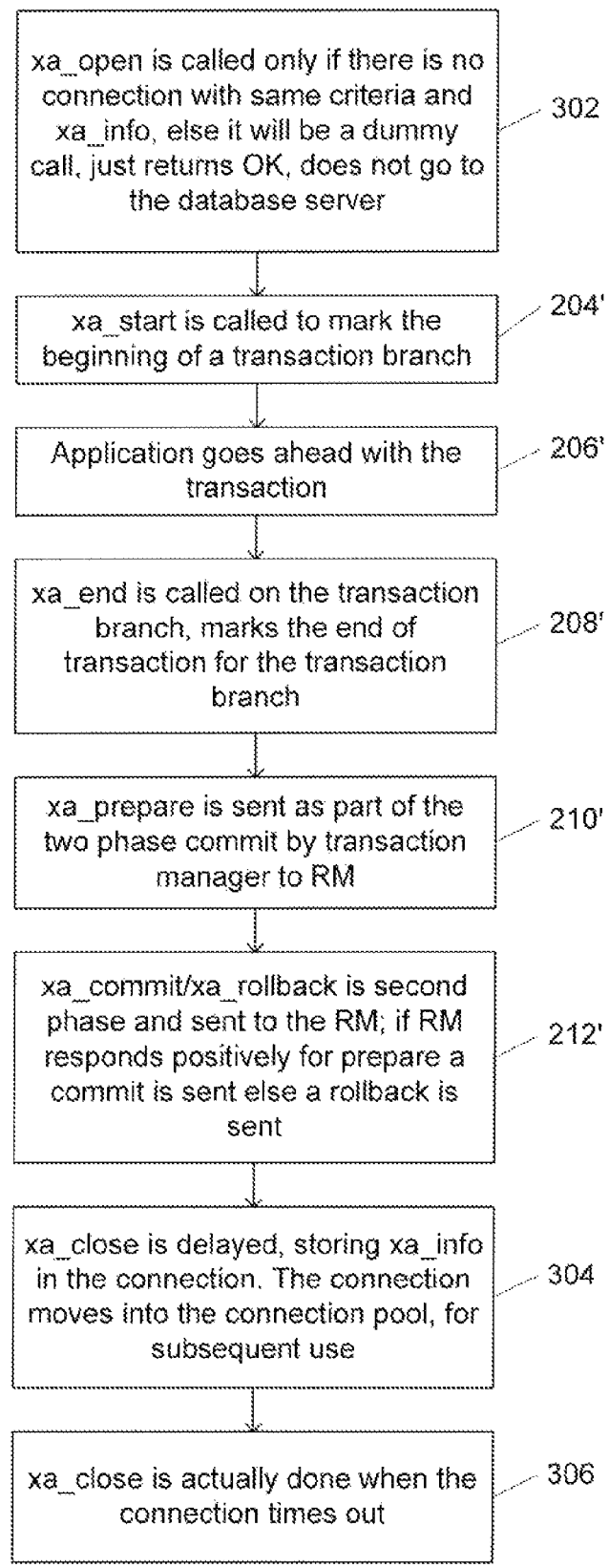
FIG. 3 is a flow chart of a flow of calls when preparing a transaction in a distributed database in accordance with the present invention.

FIG. 3 is a flow chart of a flow of calls when preparing a transaction in a distributed database in accordance with the present invention. Referring to FIG. 3, first, xa_open is called only if there is no connection within the connection pool 108 with the same criteria and xa_info, otherwise it will be a dummy call that returns OK and does not go to the database server, via step 302. xa_info contains instance specific information, like database server name, database name, and flags.

Next, xa_start is called to mark the beginning of a transaction branch, via step 204'. Branch is basically the part of the transaction which is associated with one particular resource manager (database server).

Then, the application program goes ahead with the transaction, via step 206'. In an embodiment it does everything that is needed. (An example is to transfer money from one account to another account where each account resides in a different database server which could be heterogeneous [Oracle, Informix, DB2, etc.]).

Thereafter, xa_end is called on the transaction branch, and marks the end of transaction for the transaction branch, via step 208'. Then, xa_prepare is sent as part of the two phase commit by transaction manager to the resource managers, via step 210'. Next, xa_commit or xa_rollback is sent to the resource managers. If all of the resource managers 110 respond positively, prepare a commit is sent and if all resource managers do not respond positively, a rollback is sent, via step 212'.

Finally, xa_close is delayed, storing xa_info in the connection. The connection moves into the connection pool, for subsequent use, via step 304.

The xa_close is actually finished when the connection times out, via step 306.

The above mechanism is a significant deviation from the existing flow of XA, and results in considerable savings in terms of xa_open's and xa_close, and is not the same as connection pooling. Furthermore, the xa_close command could be delayed if there is no need to move the connection if it is already in the connection pool.

The invention can take the form of an entirely hardware implementation, an entirely software implementation, or an implementation containing both hardware and software elements. In one aspect, the invention is implemented in software, which includes, but is not limited to, application software, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk—read-only memory (CD-ROM), and compact disk—read/write (CD-RAN).

Although the present invention has been described in accordance with the embodiments shown, one of ordinary skill in the art will readily recognize that there could be variations to the embodiments and those variations would be within the spirit and scope of the present invention. The present invention can be embodied by a computer readable medium wherein program instructions residing on said medium are executed by said computer. Accordingly, many modifications may be made by one of ordinary skill in the art without departing from the spirit and scope of the appended claims.

Although the present invention has been described in accordance with the embodiments shown, one of ordinary skill in the art will readily recognize that there could be variations to the embodiments and those variations would be within the spirit and scope of the present invention. The present invention can be embodied by a computer readable medium wherein program instructions residing on said medium are executed by said computer. Accordingly, many modifications may be made by one of ordinary skill in the art without departing from the spirit and scope of the appended claims.

What is claimed is:

1. A computer-implemented method for optimizing the number of xa_open and xa_close calls in a distributed database system, wherein the computer performs the following functions comprising:

providing a xa open call from an application to create a new connection only if it is determined that an existing connection within a connection pool does not have the same xa criteria and xa info, wherein a dummy call is created that returns OK if it is determined that an existing connection within the connection pool has the same xa_criteria and xa_info and can already be utilize by the application, wherein the xa_info comprises instance specific information including database server name, database name, and flags; and in response to receiving an xa_close call from the application, delaying the xa_close call until a time out of the existing or new connection, wherein the only event which triggers performing of the xa_close call is the time out of the existing or new connection, upon which a resource manager is closed;

wherein a two phase commit operation is performed that ensures modifications between multiple resources commit together or rollback together without having to perform additional xa_open calls to the distributed database system.

2. A non-transitory computer readable medium containing program instructions wherein the program instructions are executed by the computer for optimizing the number of xa_open and xa_close calls in a distributed database system for distributed transactions, wherein the computer performs the following functions comprising:

providing a xa open call from an application to create a new connection only if it is determined that an existing connection within a connection pool does not have the same xa criteria and xa info, wherein a dummy call is created that returns OK if it is determined that an existing connection within the connection pool has the same xa_criteria and xa_info and can already be utilized by the application, wherein the xa_info comprises instance specific information including database server name, database name, and flags; and in response to receiving an xa_close call from the application, delaying the xa_close call until a time out of the existing or new connection, wherein the only event which triggers performing of the xa_close call is the time out of the existing or new connection, upon which a resource manager is closed;

wherein a two phase commit operation is performed that ensures modifications between multiple resources commit together or rollback together without having to perform additional xa_open calls to the distributed database system.

* * * * *